(12) United States Patent
Choi (10) Patent No.: US 9,618,706 B2
(45) Date of Patent: Apr. 11, 2017

(54) OPTICAL CONNECTOR

(71) Applicant: A. J. World Co., Ltd., Seoul (KR)

(72) Inventor: An Joon Choi, Seoul (KR)

(73) Assignee: A. J. World Co., Ltd., Seoul (KR)

( * ) Notice: Subject to any disclaimer, the term of this patent is extended or adjusted under 35 U.S.C. 154(b) by 0 days.

(21) Appl. No.: 14/768,457

(22) PCT Filed: May 14, 2015

(86) PCT No.: PCT/KR2015/004819
§ 371 (c)(1),
(2) Date: Aug. 18, 2015

(87) PCT Pub. No.: WO2016/182101
PCT Pub. Date: Nov. 17, 2016

(65) Prior Publication Data
US 2016/0334586 A1 Nov. 17, 2016

(30) Foreign Application Priority Data

May 13, 2015 (KR) .................... 10-2015-0066662

(51) Int. Cl.
*G02B 6/38* (2006.01)

(52) U.S. Cl.
CPC ............ *G02B 6/3887* (2013.01); *G02B 6/387* (2013.01)

(58) Field of Classification Search
CPC .............................. G02B 6/387; G02B 6/3887
See application file for complete search history.

(56) References Cited

U.S. PATENT DOCUMENTS

2013/0266269 A1* 10/2013 Li ..................... G02B 6/3624
385/81

FOREIGN PATENT DOCUMENTS

KR 10-2011-0037342 4/2011
KR 10-2012-0050355 5/2012

OTHER PUBLICATIONS

Grounds of Reason for Rejection Dated Dec. 1, 2016 From the Korean Intellectual Property Office Re. Application No. 10-2015-0066662. (6 Pages).

* cited by examiner

*Primary Examiner* — Ryan Lepisto (57) ABSTRACT

An optical connector which includes a body including a contact part having a contact groove, a cover having an outer surface on which a protruding lock region is formed, a first insertion part formed on one side end portion of the contact part, and a second insertion part formed on the other side end portion of the contact part. A holder is inserted to be slidable onto the contact part and the cover. A guide protrusion is formed to protrude from each side surface of the cover. A guide slot concavely formed on each inner side surface of the holder in a longitudinal direction of the holder. The guide protrusion is inserted into and guided by the guide slot. The guide slot includes an unlock region in which a vertical distance from an inner upper surface of the holder to a contact point of the guide slot.

7 Claims, 14 Drawing Sheets

OPTICAL CONNECTOR

RELATED APPLICATIONS

This application is a National Phase of PCT Patent Application No. PCT/KR2015/004819 having International filing date of May 14, 2015, which claims the benefit of priority of Korean Patent Application No. 10-2015-0066662 filed on May 13, 2015. The contents of the above applications are all incorporated by reference as if fully set forth herein in their entirety.

FIELD AND BACKGROUND OF THE INVENTION

The present invention relates to a plug for an optical fiber and an optical connector including the same, and more particularly, to a plug for an optical fiber including a boot part which holds a fiber-optic cable according to screw-coupling of a screw cap and an optical connector including the same.

BACKGROUND ART

A communication technology for connecting a telephone office to a communication room in a large building using fiber-optic cables is referred to as fiber-to-the-office (FTTO).

Recently, fiber-to-the-home (FTTH) systems for connecting a device of a subscriber in a home so that various types of information including broadcasting, telecommunication, and the like can be provided have been developed and installed in general houses in addition to newly constructed apartments.

A process of installing the FTTH system includes a process of connecting an optical terminal box installed in a communication room of an apartment or the like with a device of a subscriber in a home using a fiber-optic cable.

An operator measures a distance from the optical terminal box to the terminal of the subscriber in the home, and installs a fiber-optic cable having a length several meters (m) greater than the measured distance between the optical terminal box and the device of the subscriber in the home. Further, the operator connects optical connectors to both ends of the fiber-optic cable, and the optical connectors are connected to each of the optical terminal box and the device of the subscriber in the home.

At this time, optical connectors, such as LC, ST, FC, and SC optical connectors, are widely used for connecting fiber-optic cables to optical terminal boxes or connecting fiber-optic cables to devices of subscribers in homes.

Meanwhile, most optical connectors, such as LC, ST, FC and SC optical connectors, are not suitable for field installation and a process of connecting such optical fibers in the field is not easy.

An optical connector disclosed in Korea Patent Publication No. 10-1041953 (opened on Jun. 9, 2011, and hereinafter referred to as 'the reference') has been proposed. The optical connector in the reference includes an optical contact member having a contact groove which accommodates an optical fiber of a fiber-optic cable. The optical fiber included in the contact groove is held by coupling a cover to the optical contact member. At this time, a holder presses and holds the optical contact member and the cover.

Such a holder is formed to move in a longitudinal direction of the optical contact member, and serves to lock the optical contact member and the cover by restricting them to each other or unlock the optical contact member and the cover by releasing the restriction according to the position of the holder.

However, since an inlet of the contact groove is narrow even when the holder is in an unlock position, the risk of damage to the fiber-optic cable is very high in a process of installing the optical fiber of the fiber-optic cable into the optical contact member.

SUMMARY OF THE INVENTION

The present invention is directed to providing an optical connector capable of minimizing damage in a fiber-optic cable and minimizing deformation of a contact part and a cover in a process of installing the fiber-optic cable.

The technical objectives of the present invention are not limited to the above disclosure, and other objectives may become apparent to those of ordinary skill in the art based on the following descriptions.

Technical Solution

One aspect of the present invention provides an optical connector including a body including a contact part having a contact groove, a cover having an outer surface on which a protruding lock region is formed, a first insertion part formed on one side end portion of the contact part, and a second insertion part formed on the other side end portion of the contact part, a holder slidably inserted into the contact part and the cover, and including an inner upper surface in contact with an outer surface of the contact part, an inner lower surface in contact with the lock region of the cover, and inner side surfaces, a guide protrusion formed to protrude from each side surface of the cover, and a guide slot concavely formed on each inner side surface of the holder in a longitudinal direction of the holder, wherein the guide protrusion is inserted into and guided by the guide slot, wherein the guide slot includes an unlock region in which a vertical distance from an inner upper surface of the holder to a contact point of the guide slot and the guide protrusion based on a vertical direction is increased in a longitudinal direction of the holder.

The guide protrusion may be formed to protrude from each of both side surfaces of the cover.

The guide protrusion may be formed on an end portion of the cover toward the first insertion part.

The unlock region may be formed to protrude from an upper sidewall of the guide slot.

A curved part may be formed on each of both side inlets of the guide slot to extend sizes of both of the side inlets.

The cover may include a guide groove which is concavely formed and disposed to be aligned with each of both end portions of the contact groove.

The holder may include an insertion guide which is formed obliquely downward on an end of the inner lower surface and guides insertion of the cover.

An end portion of the first insertion part may include a collet-type grip part.

The cover may include an insert block formed to protrude from a corner thereof, and the contact part may include an insertion slot concavely formed for the insert block to be inserted.

A vertical distance (h) from the inner upper surface of the holder to the contact point of the guide slot and the guide protrusion is calculated by the following Equation 1:

$$h = H - r + t (t = 0.1)$$  Equation 1

Here, H is a vertical distance from the inner upper surface of the holder to a center of the guide protrusion, r is a radius of the guide protrusion, and t is a clearance between the contact part and the cover.

Advantageous Effects

DESCRIPTION OF SPECIFIC EMBODIMENTS OF THE INVENTION

Hereinafter, exemplary embodiments of the present invention will be described in detail with reference to the accompanying drawings. Additional objects, features and operational advantages, including the object, constitution and effects of the present invention, will become more apparent from the detailed description of the preferred embodiments. Further, the terms or words used in the specification and claims are not to be interpreted by their typical or dictionary meanings but their meanings and concepts should be construed in conformity with the technical idea of the invention, based on the principle that the inventor can properly define the concepts of the terms to explain the invention in the best manner. Further, in the following description of the present invention, a detailed description of known functions and configurations incorporated herein will be omitted when it may make the subject matter of the present invention rather unclear.

Terms including ordinal numerals such as "second," "first," etc. may be used to describe various components, but the components are not limited by such terms. The terms are used only for the purpose of distinguishing one component from other components. For example, a first component may be designated as a second component without departing from the scope of the present invention. In the same manner, a second component may be designated as a first component. The term "and/or" encompasses both combinations of the plurality of related items disclosed and any item from among the plurality of related items disclosed.

Figure 1:
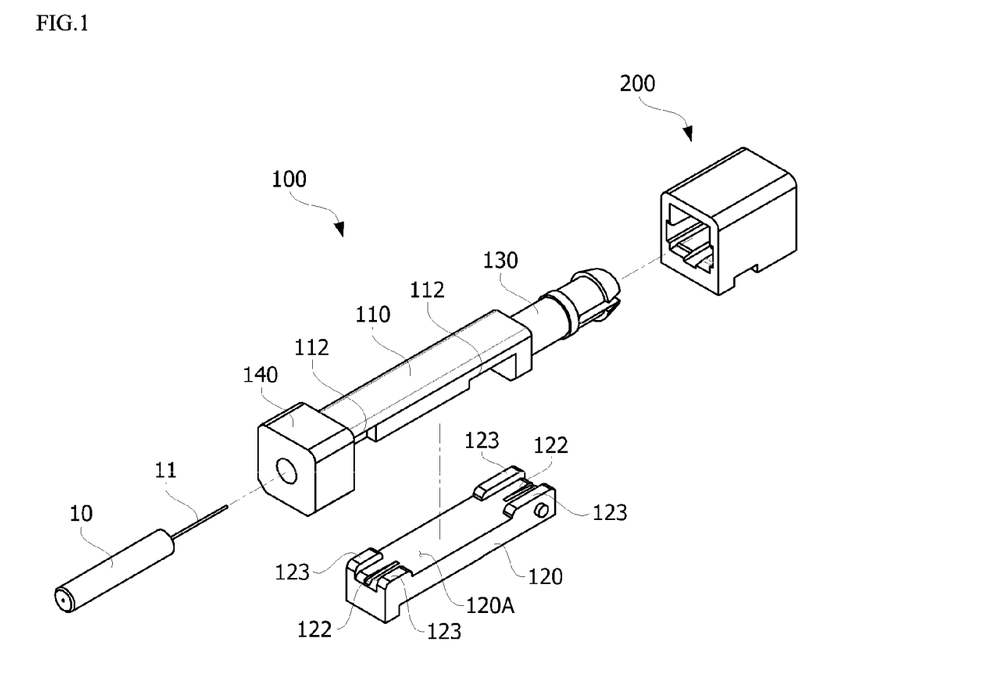
FIG. 1 is a view illustrating an optical connector according to an exemplary embodiment of the present invention.

FIG. 1 is a view illustrating an optical connector according to an exemplary embodiment of the present invention. Here, FIG. 1 clearly illustrates only main features such that the present invention can be conceptually and clearly understood, and the drawing may be variously modified and is not intended to limit to the scope of the present invention to the particular shapes shown therein.

Referring to FIG. 1, the optical connector according to the exemplary embodiment of the present invention may include a body 100 and a holder 200.

First, the body 100 may include a contact part 110, a cover 120, a first insertion part 130, and a second insertion part 140. Here, the contact part 110, the first insertion part 130, and the second insertion part 140 are classified and described according to shapes and functional characteristics thereof, and may be vertically connected to each other as a single unit.

Figure 14:
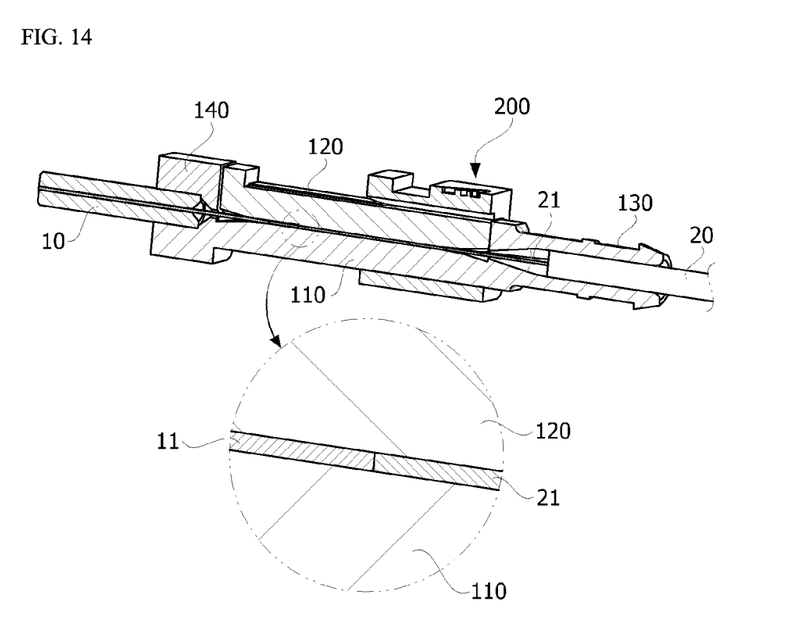
FIG. 14 is a view illustrating a state in which the contact part and the cover are held by the holder in a state shown in FIG. 12.

The contact part 110 serves to contact an optical fiber 11 (see FIG. 14) of a ferrule 10 (see FIG. 14) with an optical fiber 21 (see FIG. 14) of a fiber-optic cable 20 (see FIG. 14). The first insertion part 130 into which the fiber-optic cable 20 is inserted may be positioned behind the contact part 110, and the second insertion part 140 into which the ferrule 10 is fixedly inserted may be positioned in front of the contact part 110.

Figure 2:
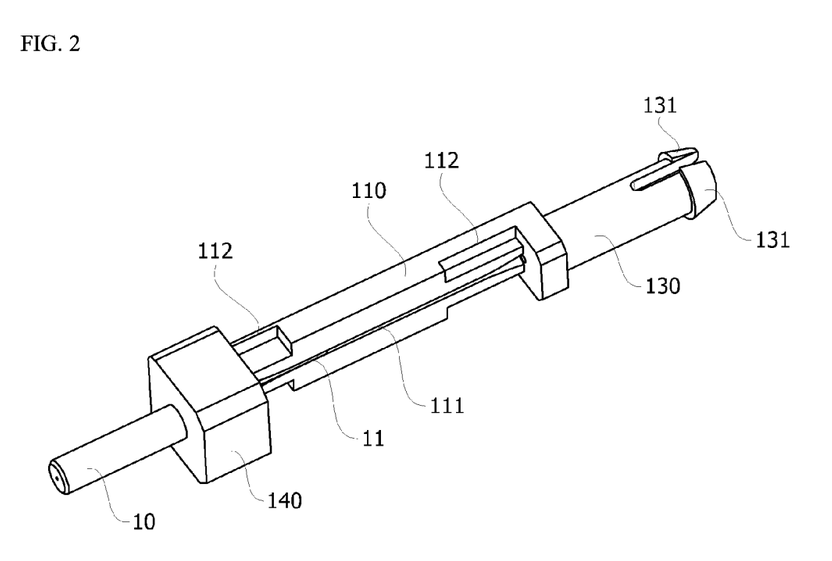
FIG. 2 is a view illustrating a contact part.
Figure 3:
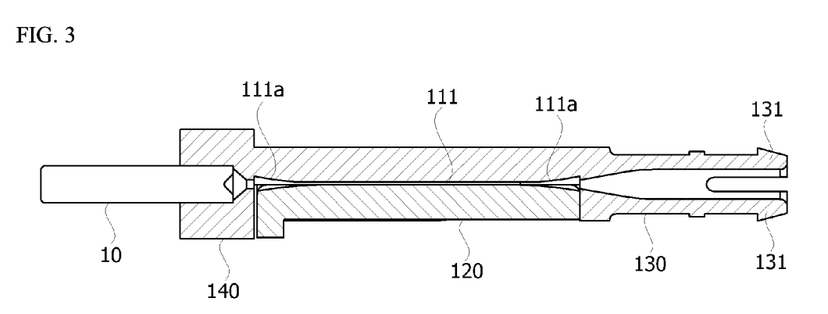
FIG. 3 is a view illustrating a contact groove.
Figure 4:
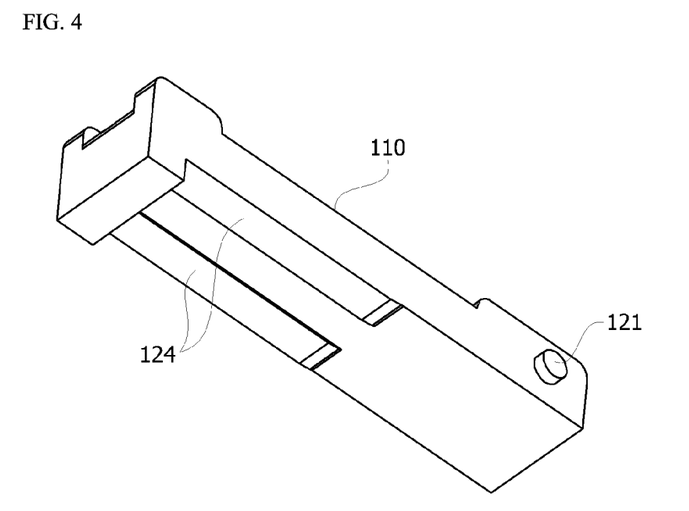
FIG. 4 is a view illustrating a lock region of the contact part.

FIG. 2 is a view illustrating a contact part, FIG. 3 is a view illustrating a contact groove, and FIG. 4 is a view illustrating a lock region of the contact part.

Referring to FIGS. 2, 3 and 4, a contact groove 111 may be concavely formed in the contact part 110. An optical fiber of a ferrule and an optical fiber of a fiber-optic cable may be connected in the contact groove 111. As shown in FIG. 3, guide grooves 111a may be formed on both sides of the contact groove 111. The guide grooves 111a are obliquely formed to extend inlets of the contact groove 111 so that the optical fiber may be easily inserted into the contact groove 111.

The cover 120 covers the contact part 110. As shown in FIG. 1, the cover 120 may include a pressing surface 120A facing the contact part 110. A mounting surface 110A in which the contact groove 111 is formed and that faces the pressing surface 120A may also be formed on the contact part 110. Further, the cover 120 may include guide protrusions 121 protruding from both side surfaces of a rear end portion thereof toward the first insertion part 130. The guide protrusions 121 are illustrated as cylindrical shapes, but the present invention is not limited thereto and may be implemented in various shapes.

Guide grooves 122 concavely formed in the pressing surface 120A of the cover 120 and aligned with the inlets of the contact groove 111 may be formed. Meanwhile, the cover 120 may include insert blocks 123 protruding from each corner of the pressing surface 120A. Each of the insert blocks 123 may be inserted into insertion slots 112 concavely formed in the contact part 110.

As shown in FIG. 4, a lock region 124 protruding from an outer surface of the cover 120 may be formed. When the holder 200 is positioned in the lock region 124, the holder 200 presses and holds the contact part 110 and the cover 120.

The first insertion part 130 is formed in a rear end portion of the contact part 110, and an end thereof is formed with collet-type grip parts 131 to hold the fiber-optic cable. The second insertion part 140 is formed in a front end portion of the contact part 110, and a hole may be formed in a center thereof so that the ferrule may be inserted.

Figure 5:
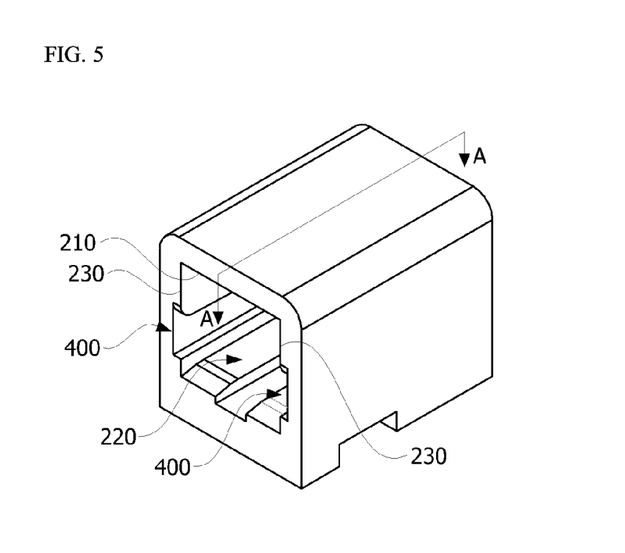
FIG. 5 is a view illustrating a holder.
Figure 6:
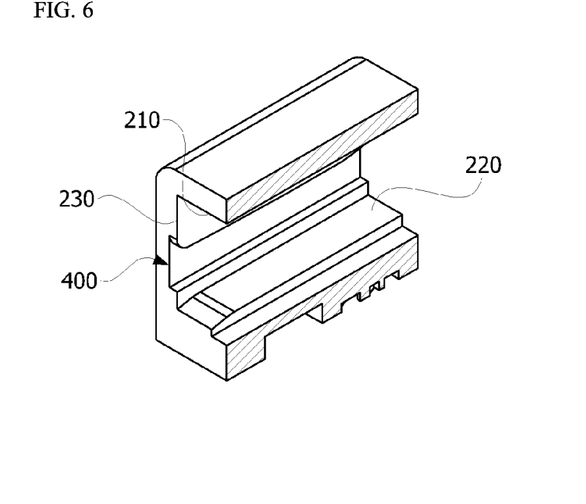
FIG. 6 is a cross-sectional view illustrating the holder shown in FIG. 5.
Figure 7:
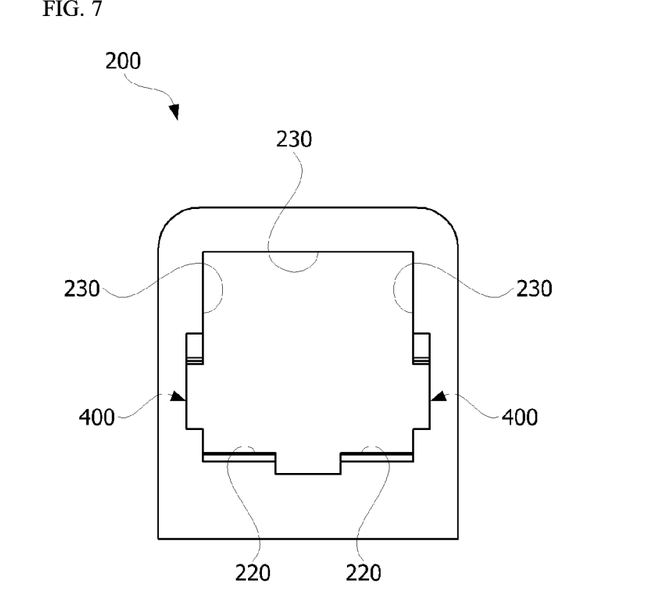
FIG. 7 is a front view of the holder FIG. 5.

FIG. 5 is a view illustrating a holder, FIG. 6 is a cross-sectional view illustrating the holder shown in FIG. 5, and FIG. 7 is a front view of the holder FIG. 5.

Referring to FIGS. 5, 6 and 7, the holder 200 serves to press and lock the contact part 110 and the cover 120 or unlock the contact part 110 and the cover 120 by releasing the pressure thereon. An operator moves the holder 200 to unlock the contact part 110 and the cover 120, and then an optical fiber of a fiber-optic cable is inserted into the contact groove 111. The holder 200 includes an accommodation space in order to move along the contact part 110 and the cover 120.

Specifically, the holder 200 may include an inner upper surface 210, an inner lower surface 220, and inner side surfaces 230. The inner upper surface 210 is in contact with an outer surface of the contact part 110, and the inner lower surface 220 is in contact with the lock region 124.

Figure 8:
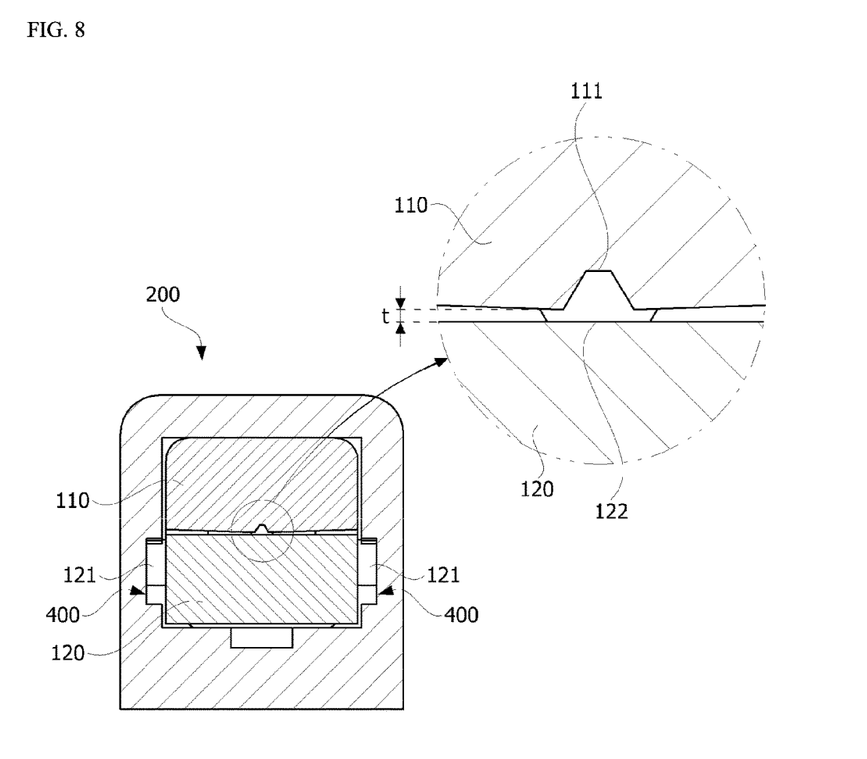
FIG. 8 is a view illustrating a gap between the contact part and a cover.

FIG. 8 is a view illustrating a gap between the contact part and a cover.

Figure 9:
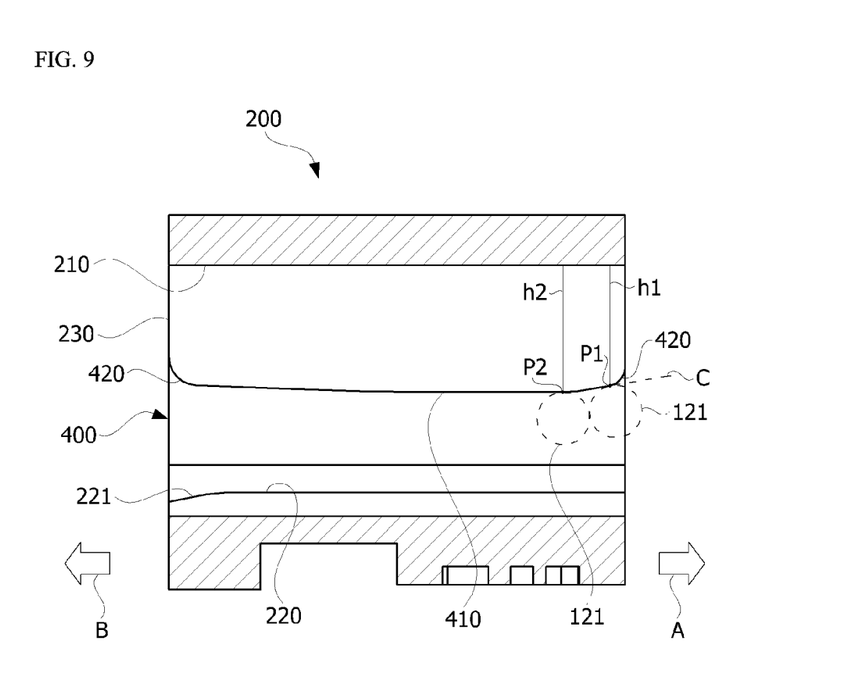
FIG. 9 is a view illustrating a guide slot of the holder.

To insert an optical fiber of a fiber-optic cable into the contact groove 111 of the contact part 110, the fiber-optic cable is inserted into the first insertion part 130. At this time, as shown in FIG. 9, when a certain clearance t between the contact part 110 and the cover 120 at the inlet of the contact groove 111 is not secured, the fiber-optic cable can be damaged. Thus, there is a configuration in which a protrusion is formed on the cover 120 or the contact part 110 around the inlet of the contact groove 111 to secure the clearance, but this configuration has a critical weakness in that the contact part 110 or the cover 120 can be deformed by a pressure of the protrusion.

Therefore, the optical connector according to the exemplary embodiment of the present invention can secure the clearance t between the contact part 110 and the cover 120 through the guide slots 400 and the guide protrusions 121.

Figure 10:
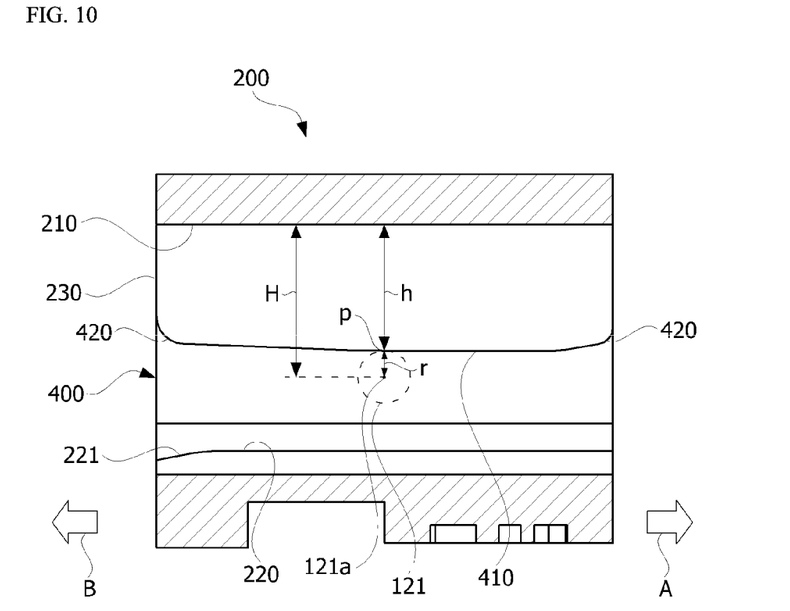
FIG. 10 is a view illustrating a position of the guide slot.

FIG. 9 is a view illustrating a guide slot of the holder, and FIG. 10 is a view illustrating a position of the guide slot.

Referring to FIG. 9, the guide slot 400 may be formed in an inner side surface 230 of the holder 200. The guide slot 400 may include an unlock region 410 in which vertical distances h1 and h2 from an inner upper surface of the holder 200 to respective contact points P1 and P2 of the guide slot 400 and the guide protrusions 121 based on a vertical direction are increased in a longitudinal direction of the holder 200.

For example, as shown in FIG. 9, when a direction A shown in FIG. 9 is defined as a direction toward the first insertion part 130 and a direction B shown in FIG. 9 is defined as a direction toward the second insertion part 140, the unlock region 410 may be formed to convexly protrude from an upper sidewall of an end portion of the guide slot 400 in the direction A shown in FIG. 9.

Thus, when contact points between both end portions of the guide slot 400 and the guide protrusion 121 are referred to as P1 and P2, a position of the guide protrusion 121 passing through the unlock region 410 of the guide slot 400 is in a downward direction based on a lateral baseline C passing through P1.

Referring to FIG. 10, an upper sidewall of the guide slot 400 forming a contact point P of the unlock region 410 of the guide slot 400 and the guide protrusion 121 may be formed to have a vertical distance h calculated by the following Equation 1 in consideration of the clearance t between the contact part 110 and the cover 120.

$$h = H - r + t (t \leq 0.1) \quad \text{Equation 1}$$

Here, h is a vertical distance from an inner upper surface of the holder 200 to the contact point P of the guide slot 400 and the guide protrusion 121, H is a vertical distance from the inner upper surface of the holder 200 to a center 121a of the guide protrusion 121, and r is a radius of the guide protrusion 12.

Meanwhile, curved parts 420 may be formed on both side inlets of the guide slot 400 to extend sizes of both of the side inlets. The curved part 420 guides the guide protrusion 121 to enter smoothly.

Further, the unlock region 410 is exemplified as convexly protruding from an upper sidewall of a rear end portion of the guide slot 400, but the present invention is not limited thereto, and the unlock region 410 may be implemented to be smoothly formed in a shape in which the guide slot 400 is bent downward.

As shown in FIG. 9, an insertion guide 221 of which an end is formed obliquely downward to guide insertion of the cover 120 may be included in a front end portion of an inner lower surface 220 of the guide slot 400.

Figure 11:
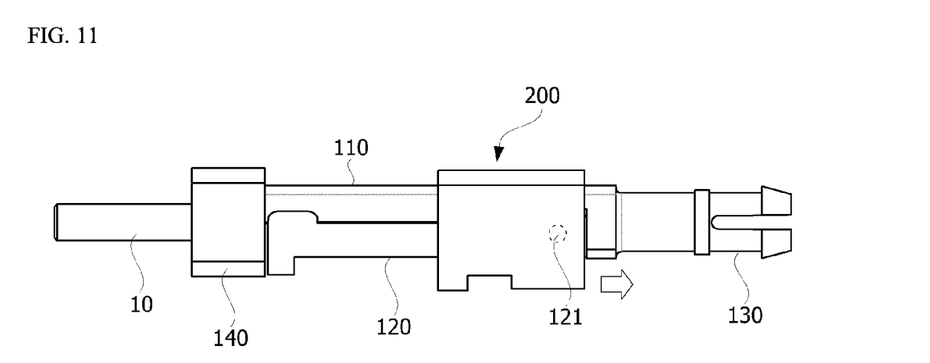
FIG. 11 is a view illustrating an unlock state.
Figure 12:
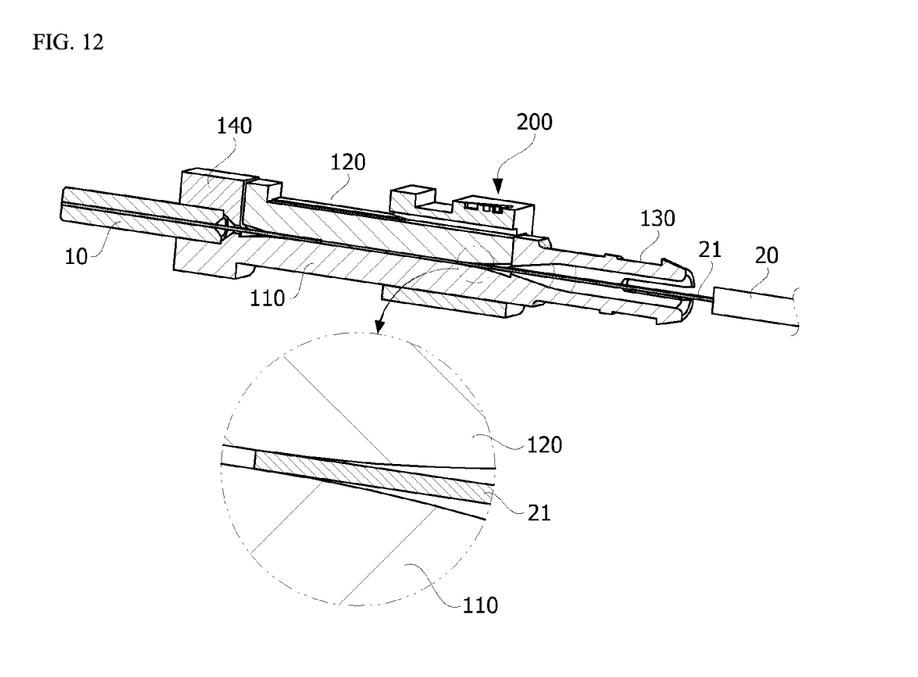
FIG. 12 is a view illustrating a state in which a gap between the contact part and the cover is secured by the holder in a state shown in FIG. 11.

FIG. 11 is a view illustrating an unlock state, and FIG. 12 is a view illustrating a state in which a gap between the contact part and the cover is secured by the holder in a state shown in FIG. 11.

To insert the optical fiber 21 of the fiber-optic cable 20, a clearance between the contact part 110 and the cover 120 has to be secured. As shown in FIGS. 11 and 12, when the holder 200 moves to the guide protrusion 121, the guide protrusion 121 is moved in a downward direction by the guide slot 400 (see FIG. 8) and a rear end portion of the cover 120 is lifted, and thus the clearance between the cover 120 and the contact part 110 is naturally secured. In this configuration, a protrusion part which is formed on the contact part 110 or the cover 120 and required to secure a gap between the contact part 110 and the cover 120 when the contact part 110 and the cover 120 are unlocked may be removed.

Figure 13:
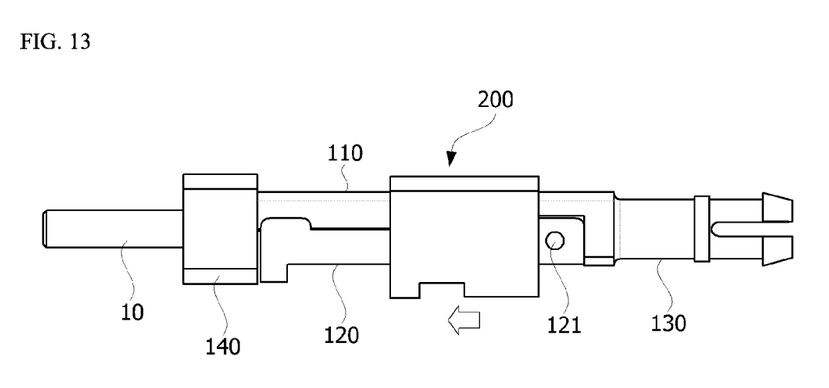
FIG. 13 is a view illustrating a holding state.

FIG. 13 is a view illustrating a holding state, and FIG. 14 is a view illustrating a state in which the contact part and the cover are held by the holder in a state shown in FIG. 12.

Referring to FIGS. 13 and 14, when an optical fiber of a fiber-optic cable is inserted into the contact groove 111 of the contact part 110 and connected to the optical fiber 11 of the ferrule 10, and then the holder 200 is moved forward, the cover 120 holds on the contact part 110 in a state in which the optical fiber 11 of the ferrule 10 and the optical fiber 21 of the fiber-optic cable 20 are pressed.

According to the embodiment of the present invention, a gap between a contact part and a cover is configured to be widened by a holder moved by interaction between a guide protrusion formed on the cover and a guide slot formed in the holder, and thus a protrusion part which is formed on the contact part or the cover and required to secure the gap between the contact part and the cover when the contact part and the cover are unlocked may be removed in the configuration.

That is, a certain clearance between the contact part and the cover is required at an inlet of a contact groove to insert the fiber-optic cable into the contact groove of the contact part. According to the embodiment of the present invention, a separate part, such as the protrusion part which makes the clearance at the inlet of the contact groove, may be removed. Thus, this can provide an advantageous effect in that the deformation of the contact part or the cover caused by the pressure of the protrusion part is minimized.

The optical connector according to the exemplary embodiment of the present invention has been described above with reference to the accompanying drawings in detail.

The above description exemplarily describes the present invention and one skilled in the art may understand that the present invention can be variously modified into, changed to, and replaced with another concrete form without changing the essential features of the present invention. Therefore, the embodiments and accompanying drawings disclosed herein are for the purpose of describing the technical sprit of the present invention only and the scope of the technical sprit is not intended to be limited by the embodiments and accompanying drawings. The scope of the present invention is interpreted according to the scope of the appended claims, and all technical concepts equivalent to the foregoing are interpreted to be included within the scope of the present invention.

INDUSTRIAL APPLICABILITY

| Description of the Symbols | |
|---|---|
| 10: ferrule | 20: fiber-optic cable |
| 11, 21: optical fiber | 100: body |
| 110: contact part | 110A: mounting surface |
| 111: contact groove | 111a: guide groove |
| 112: insertion slot | 120: cover |
| 120A: pressing surface | 121: guide protrusion |
| 122: guide groove | 123: insert block |
| 124: lock region | 130: first insertion part |
| 131: grip part | 140: second insertion part |
| 200: holder | 210: inner upper surface |
| 220: inner lower surface | 230: inner side surface |
| 400: guide slot | 410: unlock region |

What is claimed is:

1. An optical connector comprising:
a body including a contact part having a contact groove, a cover having an outer surface on which a protruding lock region is formed, a first insertion part formed on one side end portion of the contact part, and a second insertion part formed on the other side end portion of the contact part;
a holder slidably inserted onto the contact part and the cover, and including an inner upper surface in contact with an outer surface of the contact part, an inner lower surface in contact with the lock region of the cover, and inner side surfaces;
a guide protrusion formed to protrude from each side surface of the cover; and
a guide slot concavely formed on each inner side surface of the holder in a longitudinal direction of the holder, wherein the glide protrusion is inserted into and guided by the guide slot,
wherein the guide slot includes an unlock region in which a vertical distance from inner upper surface of the holder to a contact point of the guide slot and the guide protrusion based on a vertical direction is increased in a longitudinal direction of the holder;
wherein the guide protrusion is formed to protrude from each of both side surfaces of the cover;
wherein the guide protrusion is formed on an end portion of the cover toward the first insertion part;
wherein a curved part is formed on each of both side inlets of the guide slot to extend sizes of both of the side inlets.

2. The optical connector according to claim 1, wherein the unlock region is formed to protrude from an upper sidewall of the guide slot.

3. The optical connector according to claim 1, wherein the cover includes a guide groove which is concavely formed and disposed to be aligned with each of both end portions of the contact groove.

4. The optical connector according to claim 1, wherein a vertical distance (h) from the inner upper surface of the holder to the contact point of the guide slot and the guide protrusion is calculated by the following Equation 1:

$$h = H - r + t (t=0.1)$$  Equation 1 where H is a vertical distance from the inner upper surface of the holder to a center of the guide protrusion, r is a radius of the guide protrusion, and t is a clearance between the contact part and the cover.

5. An optical connector comprising:
a body including a contact part having a contact groove, a cover having an outer surface on which a protruding lock region is formed, a first insertion part formed on one side end portion of the contact part, and a second insertion part formed on the other side end portion of the contact part;
a holder slidably inserted onto the contact part and the cover, and including an inner upper surface in contact with an outer surface of the contact part, an inner lower surface in contact with the lock region of the cover, and inner side surfaces;
a guide protrusion formed to protrude from each side surface of the cover; and
a guide slot concavely formed on each inner side surface of the holder in a longitudinal direction of the holder, wherein the guide protrusion is inserted into and guided by the guide slot,
wherein the guide slot includes an unlock region in which a vertical distance from an inner upper surface of the holder to a contact point of the guide slot and the guide protrusion based on a vertical direction is increased in a longitudinal direction of the holder;
wherein the glide protrusion is formed to protrude from each of both side surfaces of the cover;
wherein the guide protrusion is formed on an end portion of the cover toward the first insertion part;
wherein the holder includes an insertion guide which is formed obliquely downward on an end of the inner lower surface and guides insertion of the cover.

6. An optical connector comprising:
a body including a contact part having a contact groove, a cover having an outer surface on which a protruding lock region is formed, a first insertion part formed on one side end portion of the contact part, and a second insertion part formed on the other side end portion of the contact part;
a holder slidably inserted onto the contact part and the cover, and including an inner upper surface in contact with an outer surface of the contact part, an inner lower surface in contact with the lock region of the cover, and inner side surfaces;
a guide protrusion formed to protrude from each side surface of the cover; and
a guide slot concavely formed on each inner side surface of the holder in a longitudinal direction of the holder, wherein the glide potrusion is inserted into and guided by the guide slot,
wherein the guide slot includes an unlock region in which a vertical distance from an inner upper surface of the holder to a contact point of the guide slot and the guide potrusion based on a vertical direction is increased in a longitudinal direction of the holder;
wherein the guide protrusion is formed to protrude from each of both side surfaces of the cover;
wherein the guide protrusion is formed on an end portion of the cover toward the first insertion part;
wherein an end portion of the first insertion part includes a collet-type grip part.

7. An optical connector comprising:
- a body including a contact part having a contact groove, a cover having an outer surface on which a protruding lock region is formed, a first insertion part formed on one side end portion of the contact part, and a second insertion part formed on the other side end portion of the contact part;
- a holder slidably inserted onto the contact part and the cover, and including an inner upper surface in contact with an outer surface of the contact part, an inner lower surface in contact with the lock region of the cover, and inner side surfaces;
- a guide protrusion formed to protrude from each side surface of the cover; and
- a guide slot concavely formed on each inner side surface of the holder in a longitudinal direction of the holder, wherein the guide protrusion is inserted into and guided by the guide slot, wherein the guide slot includes an unlock region in which a vertical distance from an inner upper surface of the holder to a contact point of the guide slot and the guide protrusion based on a vertical direction is increased in a longitudinal direction of the holder;
- wherein the guide protrusion is formed to protrude from each of both side surfaces of the cover;
- wherein the guide protrusion is formed on an end portion of the cover toward the first insertion part;
- wherein the cover includes an insert block formed to protrude from a corner thereof, and the contact part includes an insertion slot concavely formed for the insert block to be inserted.

* * * * *